Dec. 28, 1954  A. G. BUHR  2,697,975
TOOL MOUNTING FOR AGRICULTURAL IMPLEMENTS
Filed March 30, 1949
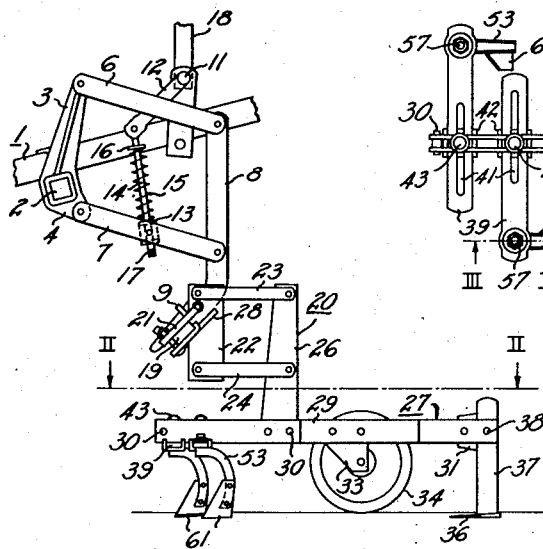
Fig. 1
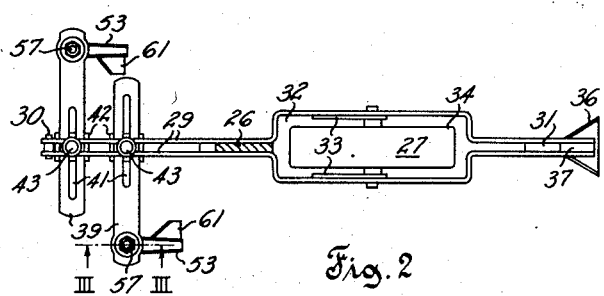
Fig. 2
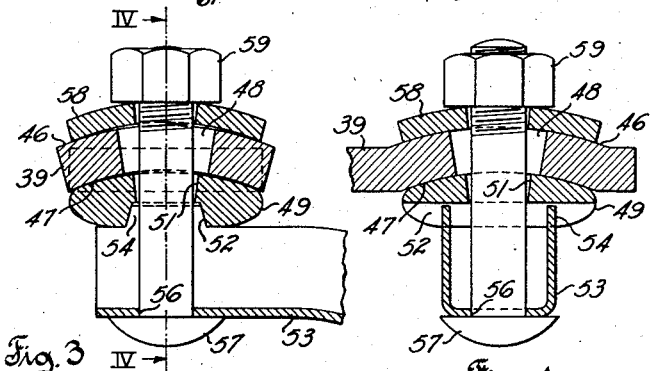
Fig. 3   Fig. 4
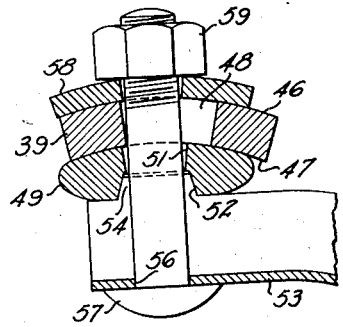
Fig. 5
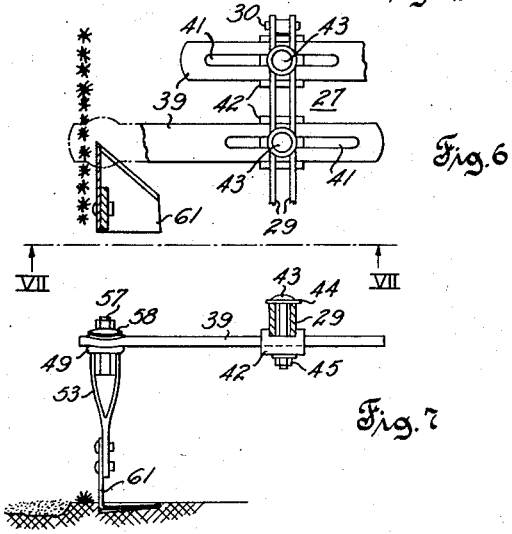
Fig. 6
Fig. 7
Inventor
August G. Buhr
by Kimball S. Wyman
Attorney

United States Patent Office 2,697,975
Patented Dec. 28, 1954

2,697,975

TOOL MOUNTING FOR AGRICULTURAL IMPLEMENTS

August G. Buhr, La Crosse, Wis., assignor to Allis-Chalmers Manufacturing Company, Milwaukee, Wis., a corporation of Delaware Application March 30, 1949, Serial No. 84,453

5 Claims. (Cl. 97—198.1)

This invention relates generally to a mounting for earth working tools and is more particularly concerned with and directed toward a construction affording particular advantage in accurately adjusting and maintaining such tools suitably positioned for a close, shallow cultivation of crop rows containing small plants of the type commonly grown on truck farms.

Vegetable crop cultivation frequently necessitates an extremely shallow depth of tool penetration, often no more than one-quarter of an inch, while the distance the tool is spaced from the plants may be no more than one-eighth of an inch. In effecting close mechanical cultivation of most such crops and particularly when the plants are small, it is necessary that the hoe or other form of tool running in immediate proximity to the plant row be so positioned as to avoid exerting a pressure on crusted soil immediately surrounding small plants as a breaking and pulling action results which tends to uproot such plants. Moreover, neither should the tool be so positioned as to direct loosened soil onto the plants. And in the case of hoe type tools, lateral tilt adjustment is necessary in order to obtain the desired penetration across the entire width of the hoe. In addition, the position of the ground working end of a close running tool must also be such that its suction effect in moving through the soil does not pull the soil away from the plants sufficiently to leave the roots exposed and does not form an immediate furrow into which the soil covering the roots will soon erode or otherwise move and produce the same uncovering result. Consequently, the adjustment of a tool for such work is extremely critical as compared to the usual adjustment of regular cultivating equipment.

In order to obtain accurate adjustment of tools for vegetable cultivation, the adjustment must be made in the field under actual working conditions and must be frequently changed to conform with different soil conditions encountered and with the type of crop undergoing cultivation. Furthermore, the nature and the extent of the adjustment necessary in each instance varies with the type of tool employed; for example, the correct adjustment for a shovel type of tool is different than that for a hoe type tool. Likewise, the adjustment of a hoe type tool may vary somewhat depending on whether the hoe is of the square or round turned type. It is therefore desirable that the tools be capable of independent adjustment so that the relative position of independent tools may be changed without disturbing their depth of penetration relative to other ools mounted on the same rig. And conversely, it is also desirable to be able to position the tool closer or farther from the plant row without changing its angular relationship.

According to this invention, practical elimination and obtainment, respectively, of the above mentioned objections and desirable features can be accomplished by employing a standard type of cultivating tool mounted on a conventional tool carrying bar through means affording angular adjustment of the ground working end of each tool with respect to the ground plane and direction of travel, as hereinafter more fully disclosed.

And it is an object of this invention to provide a mounting for ground working tools incorporating parts constructed and combined for coaction in an improved manner operative to maintain the ground working end of a tool correctly positioned relative to a plant row and relative to the ground as the tool carrying bar is raised or lowered relative to the ground and/or adjusted laterally to conform with variations in the row spacing of different crops.

Another object of this invention is to provide an improved mounting for a ground working tool wherein the tool is secured to a carrying bar through an attaching means selectively adjustable to change the position of the ground working end of a tool as to its forward tilt, lateral tilt, and/or horizontal angular offset, with respect to the direction of travel.

Still another object of this invention is to provide a vegetable type cultivator rig incorporating an improved mounting affording independent universal adjustment of the ground working tools so that the relative position of individual tools may be changed without disturbing their depth of penetration relative to other tools.

A further object of this invention is to provide an improved tool shank mounting affording universal adjustment of the ground working end of the tool and providing a positive clamping means operative to securely fix the tool in any selected position of adjustment.

Therefore the invention may be considered as comprising the various constructions and/or combinations hereinafter more fully set forth in the following detailed description and appended claims, reference being had to the accompanying drawings, in which:

Fig. 1 is a side elevation of a vertically adjustable tool rig embodying the invention;

Fig. 2 is a view taken on the line II—II of Fig. 1;

Fig. 3 is an enlarged view taken on line III—III of Fig. 2;

Fig. 4 is a view taken on line IV—IV of Fig. 3;

Fig. 5 is a view similar to Fig. 3 showing an adjusted position of the tool shank;

Fig. 6 is a plan view of a forward portion of the rig with parts broken away to better show the relation of the tool to the plant row; and Fig. 7 is a view taken on line VII—VII of Fig. 6.

Referring to Figs. 1 and 2 it will be seen that apparatus chosen to illustrate the present invention is mounted on a traveling support of which only a frame portion 1 is shown in the interest of simplicity, it being understood that this frame portion may be part of a tractor or any other suitable form of traveling vehicle. Frame portion 1 supports a laterally outward extending rigid tubular bar 2 which is fixedly secured to the frame portion 1 in any suitable manner not shown. The outer end of bar 2 fixedly mounts a conventional hanger provided with upper and lower arm extensions 3 and 4, respectively, pivotally supporting the forward ends of a pair of rearwardly extending upper and lower parallel links 6 and 7, respectively. The rear ends of these links are pivotally attached to and support a generally vertically disposed rear link 8 which extends forward and downward beneath lower link 7 and terminates in a forwardly facing support 9. The traveling support or frame portion 1 is provided with a laterally extending rock shaft 11 terminating on its near side in a forwardly extending lift arm portion 12, the latter having its free end connected in lifting relation to lower link 7 by means of a pivot block 13 secured to an intermediate portion of link 7, a rod 14 slidably passing through block 13 and having its upper end pivotally connected with lift arm 12, a compression spring 15 surrounding rod 14 with its lower end bearing against the top side of block 13 and with its upper end engaging an annular spring seat 16 carried by an upper portion of this rod. In this connection it is to be understood that upward withdrawal of rod 14 from pivot block 13 is prevented by a suitable stop means 17 on the lower end of the rod and that the rock shaft is suitably actuated and retained in any selected position of vertical adjustment by means of an upwardly etxending lever 18 of which only the lower portion is shown. However, it is to be further understood that this lever, as is common practice, is extended upward to a point within easy reach of a person seated on the operator's station of the traveling support, not shown.

Support 9 mounts a rigid laterally disposed rectangular bar member 19, which in turn supports a tool rig 20 by means of a detachable bar engaging clamp 21 fixedly secured in any suitable manner to the forward edge of a rigid plate-like rig element 22. Rig 20 also includes a pair of upper and lower rearwardly extending links 23 and 24, respectively, having their forward ends pivotally supported on vertically spaced portions of plate-like element 22 and having their rear ends similarly pivotally connected with a rigid upstanding part 26 of a tool mounting frame 27. From the description thus far it should be apparent that the support 9 may be vertically raised and lowered through means of the parallel linkage comprising link elements 6, 7 and 8, and that such raising and lowering may be readily accomplished by means of lever 18, rock shaft 11, lift arm 12 and the lost motion rod connection with lower link 7. Furthermore, it should also be obvious that since rig element 22 is fixedly secured to bar member 19, this part of the tool rig will likewise be raised and lowered in accordance with the movement of support 9. And in order that tool frame 27 may likewise be raised and lowered through actuation of lever 18, plate-like element 22 is provided with a stop projection 28 adapted to be engaged by the underside of upper link 23 after this plate-like element has moved upward a predetermined distance, whereupon further upward movement of the support 9 will effect a corresponding upward movement of frame 27.

Tool frame 27 comprises a pair of strap-like members 29 secured together in spaced generally parallel relation by means of a plurality of longitudinally spaced bolts 30 and spacer elements 31, the bottom portion of upstanding part 26 also functioning as a spacer element. Strap members 29 have intermediate portions thereof oppositely outwardly offset to provide an enlarged space 32 therebetween in which is suitably mounted, as by means of laterally aligned depending brackets 33, a ground engaging wheel 34. The rear end of frame 27 mounts a sweep element in longitudinal alignment with ground wheel 34, this sweep element including a soil loosening portion 36 and a vertically extending shank 37 which is rectangular in cross section and has its upper portion clamped between the free rear ends of parallel frame members 29 as by means of a bolt 38. Preferably, the rear edge of rear spacer element 31 abuts the forward edge of shank 37 as indicated in Fig. 1. The forward end of frame 27 mounts a pair of similar oppositely extending tool supporting members or bars 39, each of which is provided with a longitudinally extending slot or opening 41 therethrough. Bars 39 are clamped to frame 27 with their top surfaces abutting the underside edges of frame members 29 by means of generally U-shaped clamps 42 each of which engages the opposite edges of the associated bar and has its upper edges provided with aligned recesses receiving the lower edges of frame members 29. Clamps 42 are each provided with a hole therethrough in alignment with the elongated opening 41 in the associated bar 39. A bolt 43 is inserted between frame members 29 and through the aligned openings in bar 39 and clamp 42, the head portion being provided with a washer 44 engaging the top edges of frame members 29. And a nut and washer assembly 45 on the lower end of this bolt engages the under side of clamp 42 to thereby secure the clamp member and bar firmly against the underside of the frame. Obviously lateral adjustment of these bar members 39 may be individually effected simply by loosening the nut on bolt 43 sufficiently to permit the bar to be slid laterally relative to the frame and U-shaped clamp member whereupon the nut is tightened to again secure the bar in the selected position.

Referring particularly to Figs. 3 and 4, it will be noted that the outer end of each bar 39 is provided with a tool mounting portion comprising vertically facing spherical seat portions formed on opposite top and bottom portions of the bar, the upper portion constituting a convex spherical seat 46, and the lower portion a concave spherical seat 47. Each bar is provided with an opening 48 extending axially and centrally through the oppositely facing spherical seat portions from one side of bar 39 to the other and a biconvex adapter or lower clamping element 49 has one convex surface complementary to and disposed in abutting engagement with the spherical seat portion 47 presented by the underside of the bar, this biconvex element having a central opening 51 therethrough generally alignable with the opening 48 through the seat portions of bar 39. The other convex surface of element 49 is provided with a recess 52 extending diametrically thereacross and the shank portion 53 of the tool carrying element to be secured to a bar 39 is preferably generally U-shaped in cross section and has a pair of laterally aligned projecting lugs 54 fixedly receivable in the recess 52 formed in the underside surface of biconvex element 49 with the lugs 54 disposed on opposite sides of the central opening 51 therethrough. Tool shank portion 53 is provided with an opening 56 through the web portion thereof which is alignable with the central openings in the seat portions of the bar and in the biconvex element when the shank portion of the tool is in engagement with the underside of biconvex element 49 as just described. In order to securely clamp tool shank portion 53 and biconvex element 49 to the underside of bar 39 with the upper convex surface of element 49 bearing firmly against concave seat portion 47, a tensioning element or bolt 57 is inserted through the aligned openings 56, 51 and 48 in tool shank portion 53, biconvex element 49 and bar 39, respectively, and through a dished resilient washer or upper clamping element 58 which surrounds the upper end of the bolt with its concave surface bearing against the convex seat portion 46 of bar 39. And when thus assembled, these parts may be frictionally secured in fixed relation to bar 39 simply by tightening the nut 59 positioned on the upper exposed end of bolt 57.

Referring particularly to Fig. 3, it will be noted that although the tool mounting parts are shown in the assembled relation just described, nut 59 has not been tightened to securely clamp these parts together as indicated in Fig. 4. Moreover, it should be noted that the radius of the upper convex surface of element 49 is greater than the radius of concave seat portion 47, and that the radius of convex seat portion 46 is greater than the radius of the underside concave surface of washer element 58, the purpose of these differences being to obtain a more positive clamping action upon tightening nut 59. In this connection it will also be noted that the diameter of hole 51 in biconvex element 49 is greater than the diameter of the shank portion of bolt 57, and that the hole 48 through the seat portions of bar 39 is in turn of greater diameter than hole 51. Also the central opening in resilient washer element 58 is larger than the diameter of the shank portion of bolt 57 and smaller than the opening 48 in bar 39. And with this arrangement it should be obvious from a comparison of Figs. 3 and 4, that upon loosening nut 59, tool shank 53, biconvex element 49 and bolt 57 may be universally angularly shifted as a unit about a vertical axis (note Fig. 5) and secured in any one of an infinite number of positions as desired. Consequently, it should be apparent that the ground working end of a tool which is mounted in this manner may be readily shifted (simply by loosening a single fastening means, such as bolt 57) to vary the position of the ground engaging part of the tool as to its forward tilt, as to its lateral tilt, and/or as to its horizontal angular offset, with respect to the direction of travel.

Referring now to Figs. 6 and 7, it will be seen that a tool may be readily shifted if necessary (horizontal angular offset) to position a side thereof in proximate parallel relation to a plant row, that the forward tilt of a hoe or other form of ground working tool part 61 may be readily varied to secure a desired angle of penetration, and that the lateral tilt of such part may also be readily varied to effectively utilize the full width of the tool without exerting pressure on crusted soil immediately adjacent the plant row. These adjustments are highly desirable and extremely critical particularly in the cultivation of extremely small plants and, since the actual adjustment necessary in order to obtain best results can only be obtained under actual working conditions, it should be apparent that the construction herein disclosed affords a practical means for effecting such adjustment with a minimum of time and effort; i. e., simply by loosening nut 59 and positioning the tool as desired. In addition, it should also be apparent that since each of the tools carried by bar elements are similarly mounted they can be adjusted individually as desired without affecting the penetration of other tools and that with this mounting the rig can be vertically adjusted as desired without in any manner affecting the position of tool adjustment as to forward tilt, as to lateral tilt, and/or as to horizontal angular offset. Furthermore, it will be noted that since bar elements 39 are also individually adjustable laterally of tool frame 27, the lateral spacing of the tools can also be readily adjusted to conform with different row spacings without in any manner adversely affecting tool adjustment as above mentioned.

The apparatus herein shown and described presents a simplified and relatively inexpensive construction which inherently accomplishes the objects and affords the advantages hereinbefore pointed out as essential for the successful mechanical cultivation of vegetable type row crops. And while apparatus constructed in accordance with this invention is particularly adapted for such work, certain features thereof are of more general application. Therefore it is to be understood that it is not intended to limit the invention to exact constructions and combinations herein disclosed for purposes of illustration as various modifications thereof, within the scope of the appended claims, may occur to persons skilled in the art.

It is claimed and desired to secure by Letters Patent:

1. In a traveling tool rig, an improved combination comprising a tool supporting member mounted for generally transverse horizontal adjustment relative to the direction of travel, said supporting member having a circular opening extending therethrough in symmetrical relation to a vertical axis and presenting oppositely facing upper and lower spherical seat portions symmetrically surrounding opposite ends of said opening, and a depending tool carrying element fixedly secured to said supporting member by attaching means including a pair of upper and lower clamping elements presenting spherical surfaces, respectively, engaging said upper and lower seat portions, said clamping elements and tool carrying element having circular openings extending vertically therethrough in general alignment with and of lesser diameter than the opening through said seat portions, and including a releasable tensioning element passing through said aligned openings and having a diameter generally the same as the diameter of the openings in said clamping elements whereby the opening in said tool supporting member affords a limited universal angular adjustment of said clamping elements about said vertical axis, said tool carrying element and said lower one of said clamping elements presenting portions coactingly shaped to retain said tool carrying element and said one clamping element fixedly engaged for movement as a unit upon releasing said tensioning element sufficiently to effect said adjustment.

2. In a traveling rig, an improved combination comprising a laterally extending tool supporting member mounted for transverse horizontal adjustment relative to the direction of travel and provided with a circular opening extending therethrough in symmetrical relation to a vertical axis, said supporting member presenting oppositely facing concave, convex spherical seat portions symmetrically surrounding opposite ends of said opening, a pair of upper and lower clamping elements disposed on opposite sides of said supporting member and having surface portions complementary to and engaging said oppositely facing seat portions; a depending tool carrying element having an upper portion engageable with a surface of said lower clamping element opposite its said complementary surface; said clamping elements and tool carrying element having circular openings extending vertically therethrough in general alignment with and of lesser diameter than the circular opening through said tool supporting member, and a releasable clamping means passing through said aligned openings and having a diameter generally the same as the diameter of the openings in said clamping elements whereby the opening in said tool supporting member affords limited universal angular adjustment of said clamping elements and releasable clamping means as a unit about said vertical axis, said upper portion of said tool carrying element and said lower clamping element presenting portions coactingly shaped to retain said tool carrying element and said one clamping element fixedly engaged for movement as a unit upon releasing said releasable clamping means sufficiently to effect said adjustment.

3. In a traveling tool rig, an improved combination comprising a tool supporting member mounted for transverse horizontal adjustment relative to the direction of travel, and having a circular opening extending therethrough in symmetrical relation to a vertical axis, said supporting member presenting spherical seat portions symmetrically surrounding opposite ends of said opening, a pair of clamping elements disposed on opposite sides of said supporting member and having surface portions complementary to and engaging said seat portions, a tool carrying element disposed in depending relation to said supporting member and having an upper shank portion fixedly engageable with a surface of one of said clamping elements opposite its said complementary surface, said clamping elements and shank portion having circular openings therethrough generally alignable with and of lesser diameter than the opening through said supporting member, and an elongated tensioning element extending through said generally aligned openings and having a diameter generally the same as the diameter of the openings through said clamping elements whereby the opening through said supporting member affords limited universal angular adjustment of said clamping elements as a unit about said vertical axis, said shank portion and said one of said clamping elements presenting portions coactingly shaped to retain said shank portion and said one clamping element fixedly engaged for movement as a unit upon releasing said tensioning element sufficiently to effect said adjustment.

4. In a traveling tool rig, an improved combination comprising a laterally extending tool supporting member mounted for transverse horizontal adjustment with respect to the direction of travel and having a circular opening extending therethrough in symmetrical relation to a vertical axis, said supporting member presenting oppositely facing top and bottom convex, concave spherical seat portions symmetrically surrounding said opening, first and second clamping elements having surface portions complementary to and engaging said concave, convex seat portions, respectively, said first clamping element having a recess extending across its surface opposite its said complementary surface, a tool carrying element disposed in depending relation to said supporting member and having an upper shank portion engaging said recessed surface of said first clamping element and being provided with spaced projections coacting with said recess to thereby prevent a relative angular movement of said first clamping element and said shank portion, said clamping elements and shank portion having circular openings extending therethrough in general alignment with and being of lesser diameter than the opening through said supporting member and with the opening through said shank portion being disposed between said projections, and an elongated tensioning element releasably extending through said generally aligned openings and having a diameter generally the same as the diameter of the openings through said first and second clamping elements whereby upon release of said tensioning element the opening through said supporting member affords limited universal angular adjustment of said clamping elements and shank portion relative to said vertical axis.

5. In combination with a tool supporting member having a circular opening extending axially from one side of said supporting member to the other, and a concave seat portion at said one side symmetrically surrounding said opening; a carrier element spaced from and facing said concave seat portion and provided with a circular opening therethrough of lesser diameter than said opening through said supporting member and being also provided with a lug projecting toward said concave seat portion, an adapter element operatively interposed between said carrier element and said tool supporting member and having an opening therethrough of approximately the same diameter as the opening through said carrier element, the side of said adapter element facing said tool supporting member having a convex surface complementary to and bearing against said concave seat portion of said supporting member with the opening in said tool supporting member in general alignment with the opening through said adapter element, and the side of said adapter element facing said carrier element being recessed to fixedly receive said lug with the opening through said carrier element in general alignment with the openings through said supporting member and adapter element, and clamping means operative to releasably secure said supporting member, carrier element, and adapter element in selectively fixed relation to one another, said clamping means comprising a washer element bearing against said other side of said tool supporting member in overlying relation to said opening through the latter and having an inside diameter less than said opening through said supporting member, and an elongated clamping element extending through said openings in said supporting member, carrier element, adapter element and washer element.

References Cited in the file of this patent

UNITED STATES PATENTS

| Number | Name | Date |
|---|---|---|
| 292,795 | Dickison | Feb. 5, 1884 |
| 1,254,618 | Moon et al. | Jan. 22, 1918 |
| 1,298,209 | Heylman | Mar. 25, 1919 |
| 1,498,008 | Alexander | June 17, 1924 |
| 1,761,465 | Chappelow et al. | June 3, 1930 |
| 2,601,165 | Moore | June 17, 1952 |

FOREIGN PATENTS

| Number | Country | Date |
|---|---|---|
| 646,432 | France | July 16, 1928 |